No. 800,168. PATENTED SEPT. 26, 1905.
R. L. MORGAN.
MOTOR TRUCK.
APPLICATION FILED MAR. 3, 1902. RENEWED APR. 19, 1905.
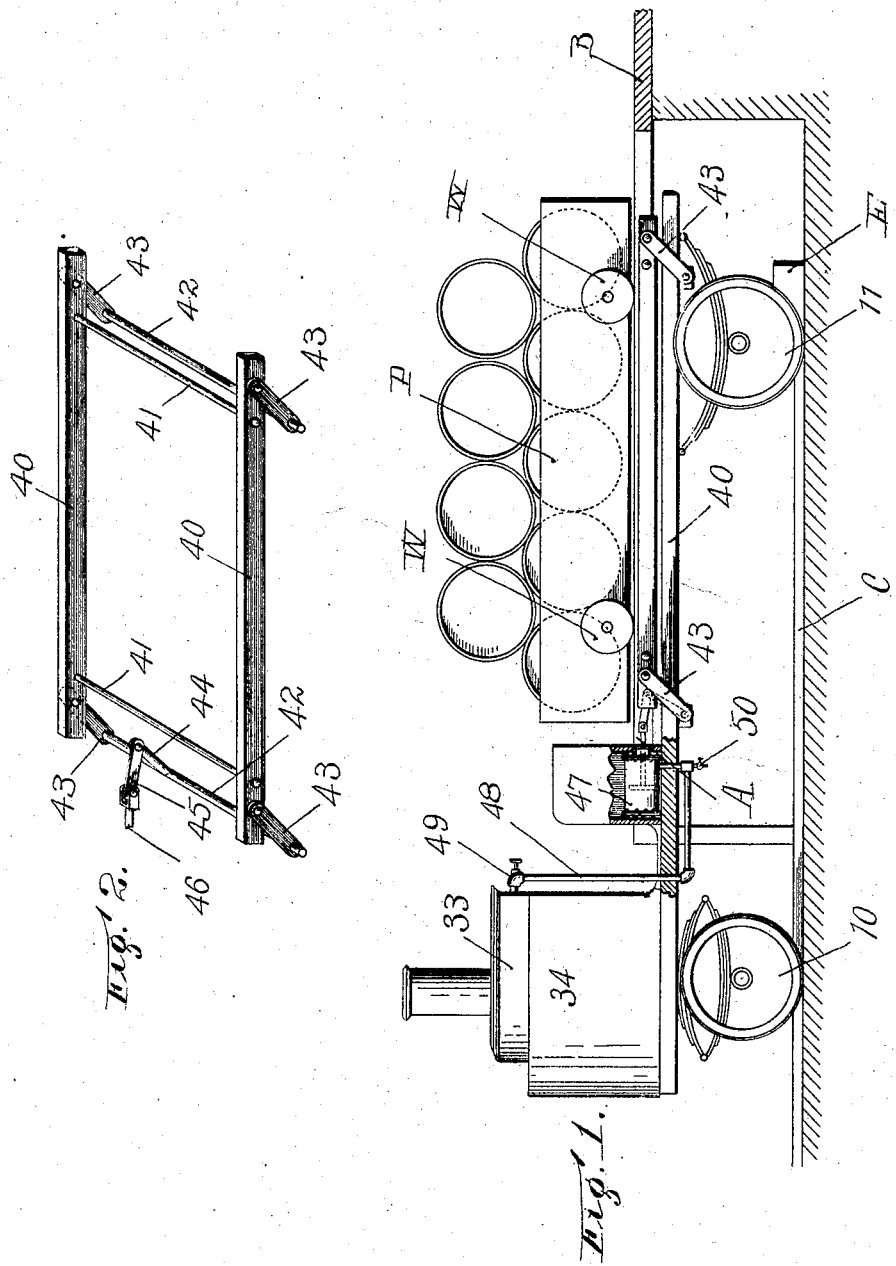

UNITED STATES PATENT OFFICE.

RALPH L. MORGAN, OF WORCESTER, MASSACHUSETTS.

MOTOR-TRUCK.

No. 800,168.          Specification of Letters Patent.          Patented Sept. 26, 1905.

Application filed March 3, 1902. Renewed April 19, 1905. Serial No. 256,411.

*To all whom it may concern:*

Be it known that I, RALPH L. MORGAN, a citizen of the United States, residing at Worcester, in the county of Worcester and State of Massachusetts, have invented a new and useful Motor-Truck, of which the following is a specification.

This invention relates to that class of wagons or motor-vehicles which are employed for trucking or freight-handling purposes.

The especial object of this invention is to provide an apparatus for loading and unloading motor-trucks which is designed to be operated by power furnished from the motor itself.

To this end the invention consists of the motor-truck and of the combinations of parts therewith, as hereinafter described, and more particularly pointed out in the claims at the end of this specification.

In the accompanying drawings, Figure 1 is a side view, partially broken away, of a motor-truck and of apparatus for loading and unloading the same constructed according to my invention; and Fig. 2 is a detail perspective view of the lifting-frame for picking up the crate or body portion when the truck is being loaded and for lowering the crate or body portion to unload the truck.

In hauling nearly all classes of freight it is usually customary to load and unload the trucks by hand. This practice is especially objectionable in loading and unloading motor-trucks on account of the time during which the truck is required to remain stationary, the large cost of a motor-truck, and the expense of skilled engineering help to run the same, requiring that for economical operation the truck should be kept on the road as much of the time as possible.

The specific loading and unloading apparatus which I have herein illustrated comprises means for supporting the sides of a crate or body so that the truck may be run into place beneath the same and means carried by the truck for picking up the crate or body and for lowering the truck when the same is to be unloaded.

The elevating connections for picking up the crate preferably consist of a lifting-frame which is arranged to be raised or swung up above the level of the truck-platform and which in practice is preferably operated from a steam-cylinder supplied with steam from the boiler of the truck.

Referring to the accompanying drawings for a detail description of a construction for practicing my invention, A designates the piers or frames for supporting the sides of a crate or body portion, which frames extend out from a platform B. Between the frames are stalls wide enough to receive a motor-truck, and located in the stalls are fixed ways or tracks C, which are provided with bumpers or stops E for stopping a truck in accurate position when the same is backed in on the tracks C.

The crate or body portion P may be provided with wheels W, so that the same may be run out onto the piers or supports A and the truck backed into place beneath the same.

The truck, as herein illustrated, may consist, essentially, of a platform-truck mounted on front wheels 10 and rear wheels 11. At its forward end the truck is provided with an engineer's cage 34 and a boiler 33.

The lifting device for picking up the crate or body portion, so that the same may be carried away on the truck, consists, essentially, of a lifting-frame comprising the side bars 40, connected by rods 41. The operating connections for lifting the frame comprise rock-shafts 42, connected to the side bars by links 43. The forward rock-shaft 42 is provided with an arm 44, which is connected by link 45 to a piston-rod 46. The piston-rod 46 is connected to a piston mounted in a steam-cylinder 47, which is supplied with steam from the boiler 33 by a pipe 48, having a valve 49. At its lowest point the steam-pipe 48 is provided with a small drainage or bleeding valve 50, which is normally left open.

In the use of this construction for loading or unloading a truck when a truck has been backed into position, as illustrated in Fig. 1, by opening the valve 49 the lifting-frame will pick up the crate P, so that the truck may carry the same off. When the truck has moved the crate P clear of the piers or frames A, the steam-valve 49 may be shut off and the escape of steam from the cylinder 47, through the bleeder-valve or drainage-valve 50, will allow the lifting-frame to gradually settle down to normal position, so that the load will rest on the platform of the truck. In unloading a truck the steam-valve is first opened again to lift the crate or body portion, so that when the truck backs into its place in the stall or slip the edges of the crate will move back over the frames or platforms A and the truck will be unloaded by shutting off the steam-valve, allowing the crate to settle down onto the frames or supports A. In practice the small amount of steam which escapes through the bleeder-valve 50 at the times when the steam-valve 49 is opened to raise the load is so small that the same can be neglected, although, if preferred, the bleeder-valve may be opened and closed at each operation.

I am aware that numerous changes may be made in practicing my invention by those who are skilled in the art without departing from the scope thereof as expressed in the claims. I do not wish, therefore, to be limited to the construction I have herein shown and described; but What I do claim, and desire to secure by Letters Patent of the United States, is—

1. In a construction of the class described, the combination of a steam-truck having a boiler for furnishing power to operate the truck, a crate or body for the truck, stationary supports for receiving the crate or body, a lifting-frame, and steam-operated connections mounted on the truck and supplied from the boiler thereof for raising the lifting-frame.

2. In a construction of the class described, the combination of a steam-truck having a boiler for supplying steam to operate the engine of the truck, a crate or body for the truck, stationary supports for receiving the crate or body, and steam-operated connections for raising the lifting-frame by steam furnished from the boiler, comprising a cylinder and piston, with a valve for admitting steam to said cylinder.

3. In an apparatus of the class described, the combination of a steam-truck having a boiler for supplying steam to operate the engine thereof, a crate or body for the truck, a lifting-frame connected by a link substantially at each corner thereof to the truck, and steam-operated connections supplied with steam from the truck-boiler for raising the lifting-frame, comprising a cylinder, a piston therein, linkwork connections between the piston and lifting-frame, a valve for admitting steam to the cylinder, and a normally open bleeding-valve permitting the steam to escape therefrom.

In testimony whereof I have hereunto set my hand in the presence of two subscribing witnesses.

RALPH L. MORGAN.

Witnesses:
    WM. V. LOWE,
    A. W. DOE.